(12) United States Patent
Boe et al.

(10) Patent No.: US 7,866,333 B2
(45) Date of Patent: Jan. 11, 2011

(54) FLUID TRANSFER SYSTEM AND METHOD

(75) Inventors: Christian Boe, Farum (DK); Anders E. Jensen, Allerød (DK); Niels Torp Madsen, Birkerød (DK); Hans Henrik Jochumsen, Allerød (DK)

(73) Assignee: Grundfos Nonox A/S, Bjerringbro (DK)

( * ) Notice: Subject to any disclaimer, the term of this patent is extended or adjusted under 35 U.S.C. 154(b) by 287 days.

(21) Appl. No.: 12/158,003

(22) PCT Filed: Dec. 22, 2006

(86) PCT No.: PCT/DK2006/050084

§ 371 (c)(1),
(2), (4) Date: Sep. 24, 2008

(87) PCT Pub. No.: WO2007/071263

PCT Pub. Date: Jun. 28, 2007

(65) Prior Publication Data

US 2009/0199538 A1     Aug. 13, 2009

(30) Foreign Application Priority Data

Dec. 22, 2005   (DK) .............................. 2005 01817

(51) Int. Cl.
*F01N 3/20*   (2006.01)
*F01N 9/00*   (2006.01)

(52) U.S. Cl. .................. 137/1; 137/565.16; 137/624.11; 60/274; 60/287

(58) Field of Classification Search ............ 137/624.11, 137/565.16, 565.11, 1; 251/129.05; 60/274, 60/287
See application file for complete search history.

(56) References Cited

U.S. PATENT DOCUMENTS

| 4,333,436 A | 6/1982 | Kopse et al. |
|---|---|---|
| 4,714,005 A * | 12/1987 | Leemhuis ............... 137/624.11 |
| 4,967,957 A | 11/1990 | Bachman |
| 6,955,145 B1 * | 10/2005 | McCabe et al. ........ 137/624.11 |
| 2003/1226349 | 12/2003 | Klenk et al. |

FOREIGN PATENT DOCUMENTS

| EP | 0 424 894 | 5/1991 |
|---|---|---|
| EP | 0 599 060 | 6/1994 |
| EP | 1 612 381 | 1/2006 |
| EP | 1 676 988 | 7/2006 |
| WO | WO 02/25075 | 3/2002 |
| WO | WO 03/033111 | 4/2003 |
| WO | WO 2005/045384 | 5/2005 |

* cited by examiner

*Primary Examiner*—Kevin L Lee
(74) *Attorney, Agent, or Firm*—Knobbe Martens Olson & Bear LLP

(57) ABSTRACT

The present invention relates to a fluid transfer system and method for transferring fluid from a reservoir (2) and to (a) delivery device typically being (a) nozzle. The present invention relates in particular to transferring urea in highly accurate metered amounts from a reservoir (2) to a nozzle (5) arranged within an exhaust system (4) of a combustion engine (1) or combustion engines.

35 Claims, 9 Drawing Sheets

FLUID TRANSFER SYSTEM AND METHOD

CROSS REFERENCE TO RELATED APPLICATION

This application is a national phase application of and claims the benefit of priority to PCT/DK/2006/050084, filed Dec. 22, 2006, which designated the United States and was published in English and claims the benefit of priority to Danish Patent Application No. PA 2005 01817, filed on Dec. 22, 2005. The disclosures of all of the aforementioned applications are hereby expressly incorporated by reference in their entirety.

The present invention relates to a fluid transfer system and method for transferring fluid from a reservoir and to delivery device typically being nozzle. The present invention relates in particular to transferring urea in highly accurate metered amounts from a reservoir to a nozzle arranged within an exhaust system of a combustion engine or combustion engines.

INTRODUCTION TO THE INVENTION

It has been found that introduction of urea into the exhaust gasses streaming from an combustion engine and into a catalytic system may dramatically increase the efficiency of the catalytic element's capability to convert NOx gasses. While urea in it self is relatively harmless to the environment and the amounts introduced into the combustion system thereby can be overdosed, such wasting of urea is often undesirably as the technology is often applied to moving vehicles and such waste would require larger storage capacities than what is actually needed if urea is dosed correctly.

A need for introducing the required amount of urea into the exhaust gasses only is therefore present. Furthermore, urea is most efficiently introduced into the exhaust gasses as a spray of droplet which typically requires that the urea is pressurised and fed to a nozzle.

BRIEF DESCRIPTION OF THE INVENTION

It is an object of the present invention to provide a fluid transfer system and method providing an efficient controllable delivery of fluid from a reservoir to a nozzle.

Thus, in a first aspect the present invention preferably relates to a fluid transfer system for transferring fluid from a reservoir to a receiving device, preferably being a nozzle, the fluid transfer system comprising
- a through flow device adapted to receive fluid from the reservoir and transfer fluid through the system and/or measuring the amount of fluid being transferred from the reservoir to the receiving device,
- a controllable shut-off valve arranged upstream of the receiving device and preferably downstream of the through flow device,
- a controlling unit controlling at least the state of the shut-off valve wherein the controlling unit is adapted to control the state of the shut-off valve
- so that the pressure of fluid being fed to the receiving device is above a first pre-selected pressure limit ($P_{min}$), and/or
- so that the delivered amount corresponds to a demand.

The through flow device may preferably comprise or is a dosing pump, a pump, a measuring unit, a measuring pump, or a combination thereof.

In the present context a number of terms are used. Even though these are used in their ordinary meaning, a further exemplary explanation is given on some of the terms.

Dynamical error in delivered amount: A dynamical error occurs when the demand for delivered fluid varies with time and is caused by a delay between when the amount is delivered an when it should have been delivered. The delay is typically due to elasticity in the fluid delivery system, delay in prosecution of controlling and/or sensing signal and/or the like. A dynamical error may be defined as the maximum value of the difference between the desired amount and the actual delivered amount during a pre-defined time. The dynamical error is not accumulated.

Accumulative error in delivered amount: An accumulative error in delivered amount is typically defined as an error which is not balanced over time.

Dosing pump: A unit delivering a precise amount of liquid controlled by an electrical signal from a control unit and which is capable of doing so against a high pressure.

Pump (p pump): A unit delivering an uncontrolled flow of liquid against a high pressure or a unit capable of maintaining a high pressure.

Measuring unit: A unit giving information (most often as electrical signals) about flow of liquid without influencing flow or pressure.

Measuring pump: A combination of a pump and the measuring unit.

Through flow device: A device adapted to receive fluid from a reservoir and transfer the fluid and/or measuring the amount of fluid being transferred from the reservoir and to a receiving device.

Demand: The amount to be delivered. Demand may be the immediate demand expressed in e.g. liter per hour [l/h] or demand accumulated over an interval expressed in e.g hour [h].

Delivery: The amount to be delivered. Delivery may be the immediate delivery expressed in e.g. liter per hour [l/h] or delivery accumulated over an interval expressed in e.g hour [h].

The invention involves preferably at least two ways of dosing fluid (further ways are explained later on). The first one may be summarised in the following manner:

1. Use of a dosing pump: In such embodiments, the dosing pump provides very accurately the amount demanded and the dosing pump is accordingly controlled to provide a delivery corresponding to a demand. The pressurisation of the fluid is preferably obtained by a combination of a fluid buffer arranged downstream of the dosing pump and a shut-off valve arranged downstream of the buffer.

The second one is based on using a measuring unit. In such embodiments, the fluid is pressurised in some manner; typically the fluid is stored pressurised in a reservoir or pressurised by a pump. A demand is typically expressed at regular intervals and the total amount to be delivered in a given interval is typically estimated to equal the demand (in l/h) at the beginning of the interval multiplied with the length (in hour) of the interval. Use of a dosing unit may be summarised in the following manner:

2a: The delivery of fluid can be estimated from a functional relationship giving delivered amount per hour multiplied by the opening time of the shut-off valve. From such a relationship the time in a given interval the valve must be open for meeting a demand. During delivery the actual delivered amount is measured by the measuring unit, and if discrepancy is found between the estimated delivered amount and the actual delivered amount a feed back is made to the algorithm determining the opening time of the shut-off valve to take into account the discrepancy.

2b: The actual delivery is measured during delivery. Once the demand in a given interval has been met, the shut-off valve is closed.

It should be noted that the above summaries are examples only, that variations of these two occurs and they are therefore not intended to be construed in a narrowing way. However, they are believed to provide an indication on a framework for the present invention. For instance, in some embodiments according to the present invention, the measuring unit and pressurisation unit are integrated into each other.

As it will appear in the following, a pump will in some embodiment pressurise fluid received from the tank. However, in some other embodiment the system receives pressurised fluid from the tank and in such embodiment the pump will not be necessary.

The present invention relates in a second aspect preferably to a method of transferring fluid from a reservoir to a receiving device, preferably being a nozzle, the fluid transfer system comprising
- a through flow device adapted to receive fluid from the reservoir and transfer fluid through the system and/or measuring the amount of fluid being transferred from the reservoir to the receiving device,
- a controllable shut-off valve (9) arranged upstream of the receiving device and preferably downstream of the through flow device,
- a controlling unit controlling at least the state of the shut-off valve the method comprising controlling the state of the state of the shut-off valve
- so that the pressure of fluid being fed to the receiving device is above a first pre-selected pressure limit ($P_{min}$), and/or
- so that the delivered amount corresponds to a demand.

Also in this connection the through flow device may preferably comprise or is a dosing pump, a pump, a measuring unit, measuring pump or a combination thereof.

The controlling of the shut-off valve to meet a given demand is preferably performed based on direct control of the shut-off valve based on the system characteristic for obtaining a minimum dynamic error and a correction signal from the measuring unit to modify an algorithm for controlling the valve in order to avoid accumulative error.

BRIEF DESCRIPTION OF THE DRAWINGS

The present invention and in particular preferred embodiments thereof will now be described in details with reference to the accompanying figures, wherein.

DETAILED DESCRIPTION OF PREFERRED EMBODIMENTS OF THE INVENTION

Figure 1:
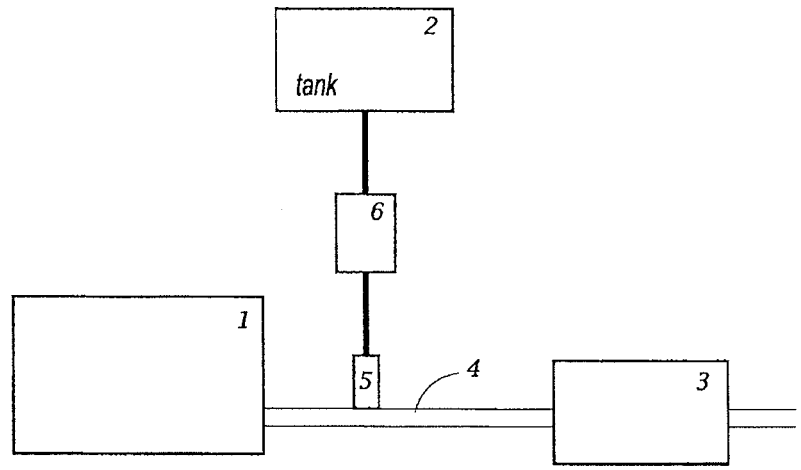
FIG. 1 shows schematically a combustion system according to a preferred embodiment of the present invention.

FIG. 1 shows a combustion system comprising a combustion engine 1, typically being a Diesel engine, a tank 2 holding a liquid solution of urea (also known under the trade name AdBlue) and a catalytic system 3. The exhaust of the engine 1 is connected to the catalytic system 3 by an exhaust pipe 4. The combustion system further comprising a nozzle 5 connected to a fluid transfer unit 6 (broadly termed "a through flow device") which is connected to the tank 2. The fluid transfer unit 6 receives the liquid solution of urea and provides it to the nozzle 5 in amounts meeting the demand for urea in the catalytic system at least to some extend.

Figure 2:
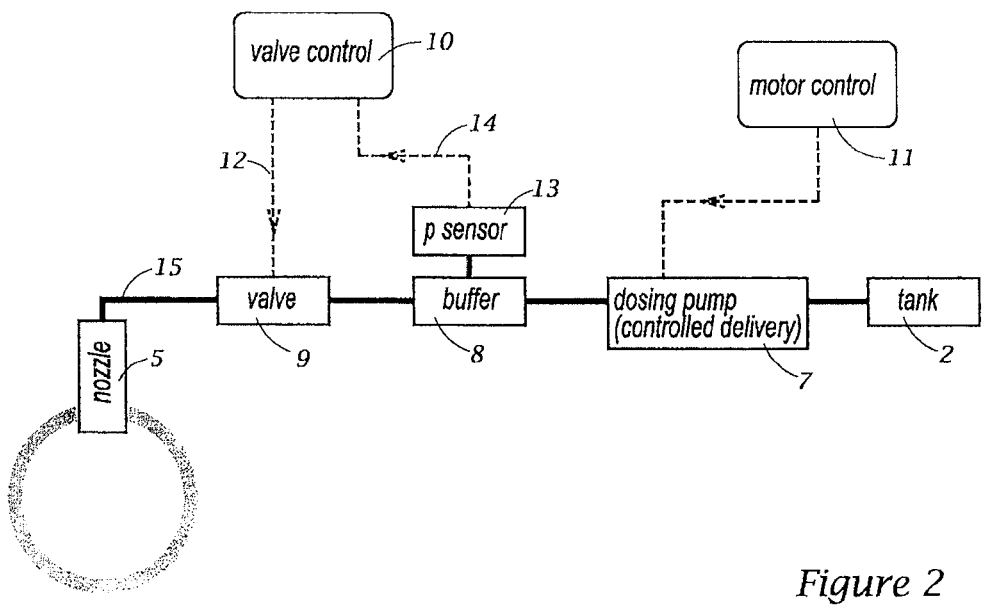
FIG. 2 shows schematically a first embodiment of a fluid transfer system unit according to the present invention.

FIG. 2 shows schematically the architecture of the fluid transfer unit (6 in FIG. 1) for introducing urea into the exhaust system of a combustion engine. Same numerals as used for designating elements in FIG. 1 are used for designating similar elements in FIG. 2. The system architecture as shown in FIG. 2 comprises a dosing pump 7 connected at its inlet to the tank 2 for pumping and dosing urea to a buffer 8. The buffer 8 is via a shut-off valve 9 connected to the nozzle 5.

The dosing pump 7, of the embodiment according to FIG. 2, is a pump pressurising fluid and generating a controllable variable flow rate and thereby a controlled delivery. This means that the actual flow rate can be controlled very precisely. The accuracy of the flow rate delivered by the dosing pump 7 is typically lower than +/−1% of the full-scale delivery when the delivery is larger than 10% of the full-scale delivery. Below that amount, the accuracy is lower than +/−10% of the reading value being the amount the dosing pump 7 is set to provide. The dosing pump is controlled by a motor control unit 11 which receives input representing the actual demand for urea and the motor control unit 11 sets the dosing pump to pump this actual demand.

In order to render the different functions of the system of FIG. 2 more visible, the motor control unit 11 and the shut-off valve control unit 10 is shown as different elements of the system. However, those two units may be assembled into a single unit. Basically, the two units serves the following two purposes:

Motor control unit 11, which on the basis of parameters defining the state of the engine e.g. load and rpm defines the actual demand for urea and signals the demand to the dosing pump 7. The dosing pump 7 may be an ordinary dosing pump measuring an amount of urea meeting the actual demand for urea and pressurise the metered amount of urea to a pressure level being sufficient for the nozzle to provide atomisation of the metered urea.

Shut-off valve control unit 10 controlling the state of the shut-off valve i.e. changes the shut-off valve state from open to close or vice versa on the basis of the pressure of the fluid measured in the buffer 8 and at the same time provides a desired distribution of the periods in which the shut-off valve is open.

All parts of the system may be integrated into a single unit. However, the tank and the nozzle are typically not integrated parts of the system, whereby the system may be placed at an appropriated place of e.g. a truck.

The nozzle 5 is a nozzle that provides atomized fluid once the pressure of the fluid fed to the nozzle 5 is above a threshold $P_{max}$. Above that threshold the amount of fluid being atomized equals the amount of fluid provided by the dosing pump 7. However, below the threshold, the nozzle 5 will not be able to atomize all fluid, as the amount of fluid streaming towards the nozzle is too small to build up a pressure above the threshold. When this occurs, the shut-off valve 9 controls whether fluid is fed to the nozzle 5 or not in the manner disclosed below. In typical applications the amount of fluid to be atomized ranges from e.g. 0.1% to 100% of the maximum amount of fluid to be atomized and atomization of a continuous flowing fluid over such an interval is typically not considered feasible.

The shut-off valve 9 is a valve that opens when the pressure in the fluid pumped towards it is above a maximum pressure limit $P_{max}$ (FIG. 3) and closes once the pressure is below a minimum limit $P_{min}$. $P_{max}$ is typically 5% higher than $P_{min}$ and $P_{min}$ is the level at which it can be assured that the fluid fed to the nozzle 5 is atomized by the nozzle 5. Below that pressure level, the nozzle 5 may be able to atomize but it can in general not be assured, as atomization requires a pressure difference across the nozzle of a certain level. Thus, when the flow rate from the dosing pump 7 is to small to provide a pressure above $P_{min}$, the shut-off valve closes and stays closed until the dosing pump 7 has pumped sufficient fluid to build up a pressure above $P_{max}$. Once the pressure exceeds $P_{max}$ the shut-off valve 9 opens and the fluid streams through the nozzle 5. During this streaming the amount being atomised is higher than what is delivered by the dosing pump 7 so the pressure drops until $P_{min}$ where the valve closes and a pressure build up is initiated again. By this procedure, the amount of fluid atomised in time average equal to the amount of fluid delivered by the dosing pump 7.

Figure 3:
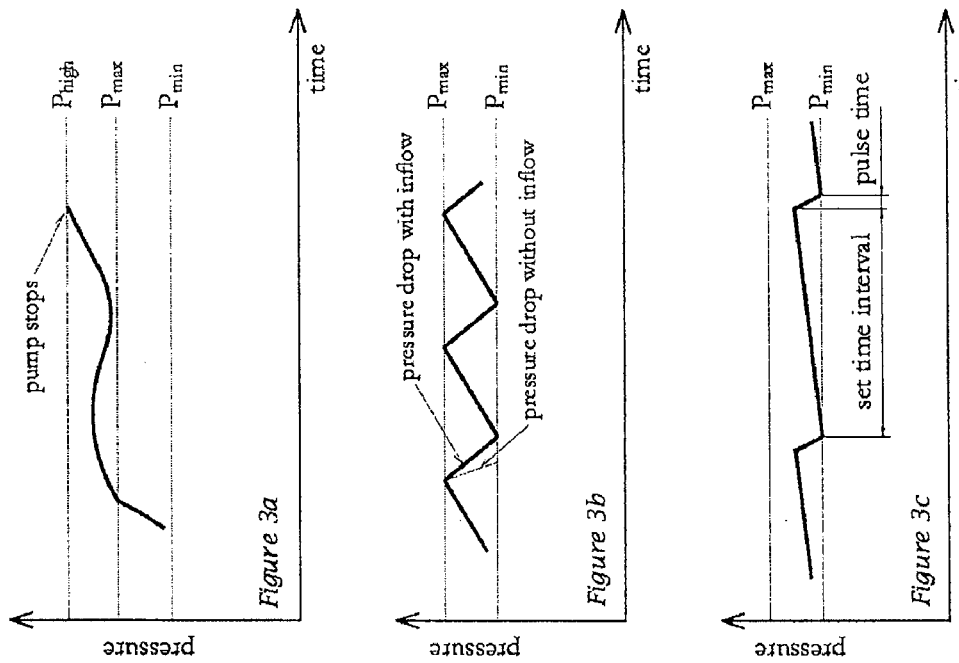
FIG. 3 shows schematically three different flow regimes obtainable by the fluid transfer systems according to the present invention.

Referring to FIG. 3, this figure shows three different atomisation regimes, large flow (FIG. 3a) medium flow (FIG. 3b) and small flow (FIG. 3c). As shown in FIG. 3a the instantaneous pressure in the flow measured at the inlet of the shut-off valve 9 is after a while constantly above the limits of $P_{max}$ and $P_{min}$. If the demand decreases, the amount of fluid pumped by the dosing pump 7 will decrease resulting in a pressure decrease. The pressure can be decreased until $P_{min}$ and stay constant at a level above $P_{min}$ as long as the decrease occurs from a level being above $P_{max}$. If the demand is very large or e.g. the nozzle 5 is clogged, the pressure may increase until it reaches a safety limit $P_{high}$ at which the dosing pump 7 stops pumping fluid but the shut-off valve 9 stays open.

When the demand for atomized fluid is at medium flow the atomisation enters into the regime disclosed schematically in FIG. 3b. In this regime, the pressure measured at the inlet of the shut-off valve 9 is at one instance lower than $P_{max}$ and the shut-off valve 9 is accordingly closed; it is here assumed that the shut-off has not been opened, i.e. the state is reached from a level where the shut-off valve has been closed. As the shut-off valve 9 is closed and the dosing pump 7 is still pumping, fluid will be accumulated in the buffer 8 and as the buffer 8 is a resilient member accumulation of fluid therein will take place resulting in that the pressure at the inlet of the shut-off valve 9 will increase. This pressure increase will continue as long as the dosing pump 7 is pumping and the shut-off valve 9 stays closed. Once the pressure reaches $P_{max}$ the shut-off valve 9 will open. Opening of the shut-off valve 9 will result in that fluid is streaming towards the nozzle 5. The fluid streaming towards the shut-off valve 9 is a combination of fluid being pumped by the dosing pump 7 and the change in volume of the buffer 8. The effect of the decreasing buffer volume is indicated in FIG. 3b with the dotted line denoted "pressure drop without inflow". The amount of fluid pumped by the dosing pump 7 is, in the regime shown in FIG. 3*b*, insufficient to keep the pressure above $P_{min}$, and once the pressure has dropped to $P_{min}$ the shut-off valve 9 closes where after accumulation of fluid in the buffer 8 begins, again, with an increasing pressure as a result. This cycle continues as long as the demand for fluid is not changed. As it appears, the flow through the nozzle 5 in this regime will be pulsed and the time length of each pulse is the time from opening of the shut-off valve at $P_{max}$ until closing of the shut-off valve at $P_{min}$ A minimum flow regime is schematically shown in FIG. 3*c*. As shown in FIG. 3*c* the pressure does not reach the limit of $P_{max}$ being the pressure at which the shut-off valve 9 open for fluid flowing to the nozzle 5. In order to atomize fluid, the shut-off valve 9 is forced open at intervals, typically being at regular intervals. The time where the shut-off valve 9 is closed is in FIG. 3*c* indicated by “set time interval” and the length thereof is pre-selected as the maximum allowable time for no delivery. The time length of a pulse is in FIG. 3*c* is indicated as “pulse time”. A cycle in this minimum flow regime comprises two phases. The first phase begins (for instance) when the pressure is at $P_{min}$ and the shut-off valve 9 closes. As the dosing pump 7 continues pumping the pressure increases as disclosed above in the medium flow regime. When the set time interval has passed the shut-off valve 9 is forced open and as the fluid flows towards and out of the nozzle 5, the pressure decreases until the pressure reaches $P_{min}$. By utilising this forced opening of the shut-off valve the time intervals between two pulses can be kept lower than if one should await a pressure build-up to $P_{max}$ and as the intervals between two pulses can be kept low one may be able to provide e.g. an even delivery of urea in the streaming exhaust gasses. The length of the time interval between two pulses is typically pre-selected and is typically found by performing experiments.

The various flow regimes, high, medium and minimum, are defined by selecting $P_{max}$ and $P_{min}$ in combination with selecting the length of “set time interval”. Actual values of these parameters are selected in accordance with an actual nozzle configuration. In a typical embodiment, $P_{max}$ is selected to be 8.4 bar, $P_{min}$ is selected to be 8.1 bar and “set time interval” is selected to be one or a few seconds. In such embodiments, the minimum amount of fluid being fed to the nozzle 5 is around 0.010 l/h, the flexibility of the buffer 8 is 160 $mm^3$/bar.

The opening and closing of the shut-off valve 9 is electromagnetically controlled from a valve controlling unit 10 as shown in FIG. 2 by the connection 12. The connection 12 transfers an electrical signal to the shut-off valve 9.

The buffer 8 may provide the effect that the frequency at which the shut-off valve 9 operates can be decreased compared to a system where no buffer 8 is incorporated in the system.

When the shut-off valve 9 is closed and the dosing pump 7 pumps fluid the pressure within the fluid transfer system increases. The fluid is considered to be incompressible and once the shut-off valve 9 is opened the pressure in the fluid transfer system will, if no buffer 8 is incorporated and the dosing pump 7 is not pumping, drop to the level outside the nozzle 5 almost instantaneously. However, as the buffer 8 is a resilient member the contraction of the buffer's 8 volume will maintain the pressure within the fluid transfer higher than $P_{min}$ for a much longer period, thus the time between two consecutive openings of shut-off valve 9 can be of sufficient length to secure a sufficient life time of the shut-off valve 9. Besides improving the valve life time expectancy the buffer will make it possible to use a much slower (and thus cheaper) valve. If the buffer is too big it can introduce an unacceptable dynamic error.

A pressure sensor 13 measures the pressure within the buffer 8. The measured pressure is used for controlling the state of the shut-off valve 9 (open or close) and the pressure measured is used as if it was the pressure measured at the inlet of the valve. The measured pressure is signalled to a controlling unit 10 via the connection 14.

The connection 15 from the shut-off valve 9 to the nozzle 5 is sufficiently stiff to assure that once the shut-off valve 9 is opened the pressure increase in the connection 15 will in a substantial manner not result in any deformation of the connection 15. If, on the other hand, the connection was not substantially stiff, opening of the shut-off valve 9 would cause the connection 15 to expand resulting in that the amount of urea streaming out of the outlet of the shut-off valve 9 would not substantial instantaneously equal the amount streaming out of the nozzle 5 which normally would be considered as introducing errors into the fluid transfer system. In order to provide suitable stiffness, the connection 15 is typically a line made of stainless steel. The stiffness of the connection 15 helps also to minimize droplets from being formed at the outlet of the nozzle as the shutting-off of the shut-off valve if done sufficiently fast will result in that no fluid will stream out of the nozzle. If, on the other hand, the connection 15 was not sufficiently stiff the connection would contract once the shut-off valve is shut-off resulting in fluid being forced out of the nozzle and a droplet formed at outlet of the nozzle. Such droplet may crystallise and result in clogging of the nozzle. It is noted that such stiff connection may be applied to all the embodiments of the invention.

Figure 4:
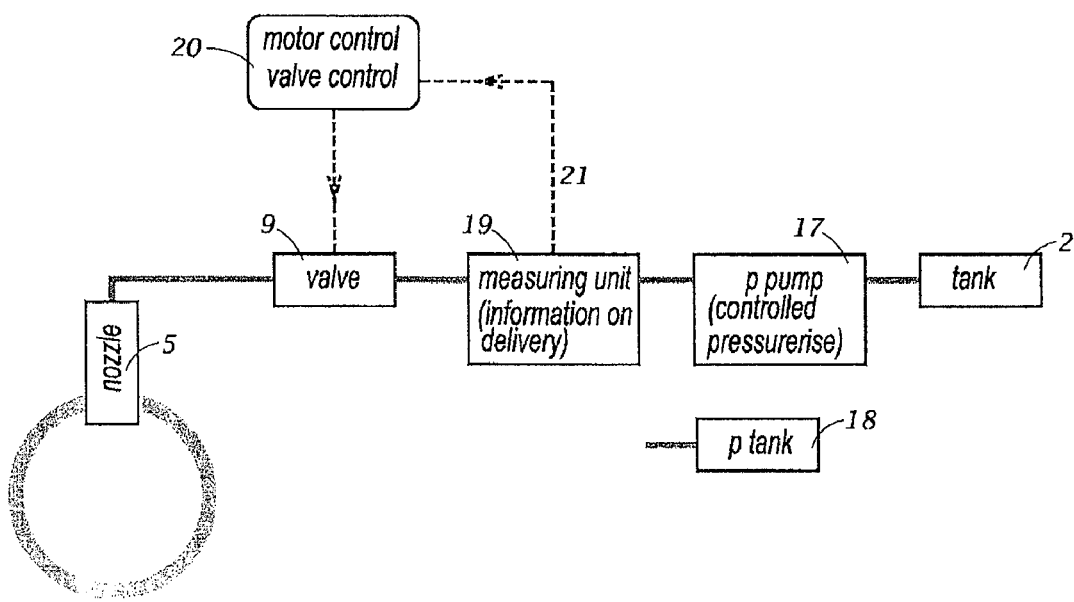
FIG. 4 shows a second embodiment of the invention in a conceptual manner

FIG. 4 shows a second embodiment of the invention in a conceptual manner. In contrast to the first embodiment where the dosing pump's delivery substantially equals the actual demand and the pressurisation is made by a combination of accumulating fluid in a buffer and a valve, the system of FIG. 4 is supplied with liquid at a constant pressure (within limits regardless of flow) from a pump 7 or alternatively from a pressurised tank 18. Measuring unit 19 providing information on the delivered amount measures the actual amount delivered. A motor/valve control unit 20 operates the shut-off valve 9 typically and preferably pulsating in a PWM (pulse width modulated) manner in accordance with the actual need for urea in relation to system specific parameters such as nozzle constant, characteristics of the valve, pressure of the fluid before the nozzle etc. In this way a change in flow as demanded from the motor conditions will very quickly be provided through the nozzle 5 thus giving a very little dynamic error. Signals via the connection 21 from measuring unit 19 will provide information for changing the PWM of shut-off valve 9 in order to minimize the accumulative error.

Figure 5:
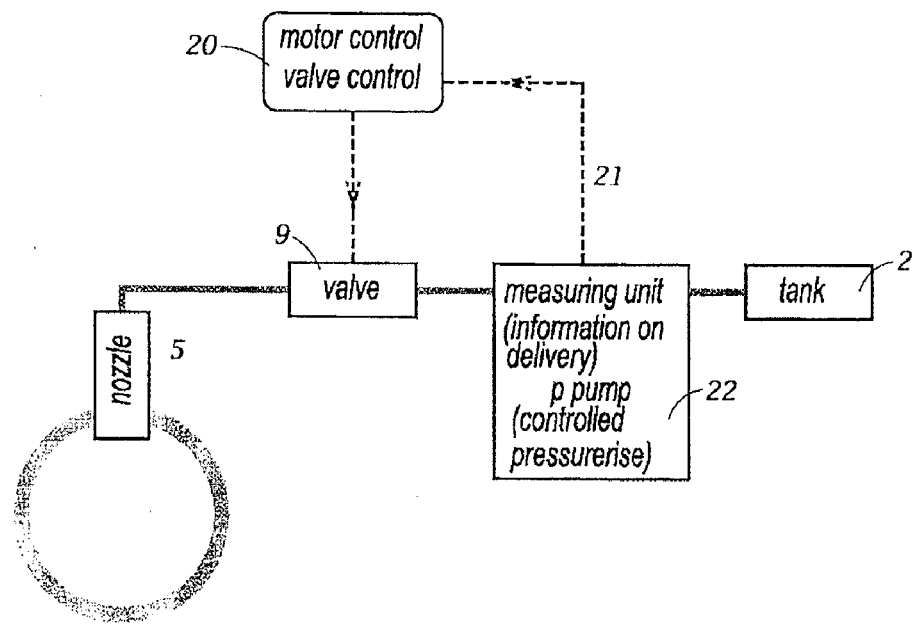
FIG. 5 shows the a variant of the system in FIG. 4 where the pressurising and measuring function is combined.

FIG. 5 shows a variant of the system in FIG. 4 where the measuring unit and pump are combined into a single unit 22.

In the following FIGS. (6, 7, 8, and 9) different embodiments for pumping and measuring functions corresponding to FIG. 4 and FIG. 5 are shown. All the embodiments have among other potentials the potential to provide a fast response (a small dynamic error) and a high accuracy (a small accumulative error).

Figure 6:
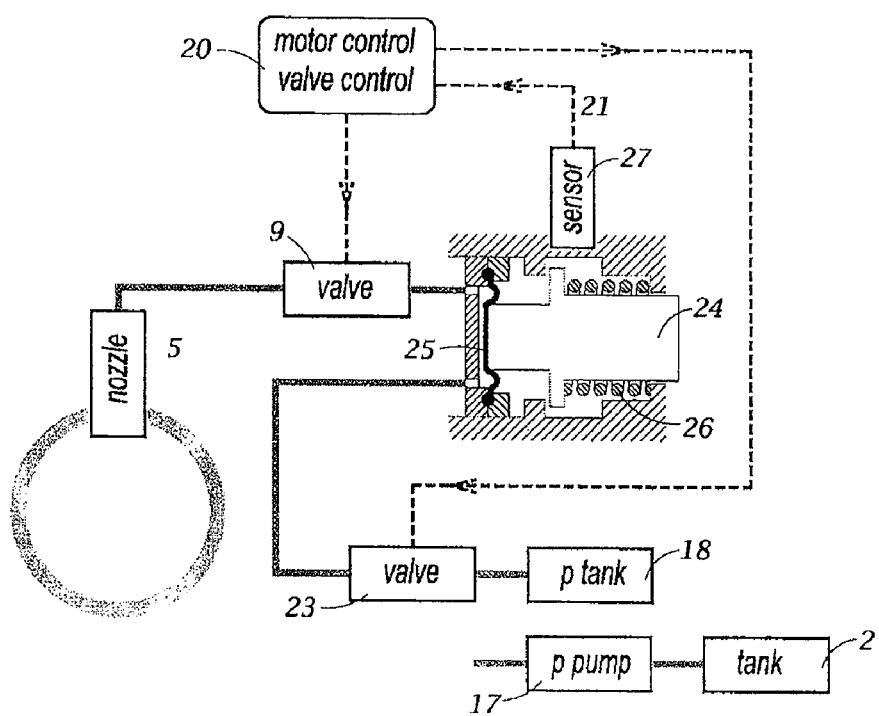
FIG. 6 shows schematically an embodiment of a fluid transfer system according to the present invention corresponding to FIG. 4.

FIG. 6 shows an embodiment of the system corresponding to FIG. 4. In this embodiment the transfer system comprises a tank 18 containing pressurised fluid. Alternatively, the tank 2 may contain fluid at ambient pressure and a pump 17 may provide pressurisation. At the outlet of the tank 18 or the pump 17 a valve 23 is provided having its outlet connected to a measuring unit. The measuring unit comprises a piston 24 attached to and acting on a membrane 25. As indicated in FIG. 6 the movement of the piston 24 and thus the membrane 25 is limited relatively to the housing to which it is attached. The piston 24 is biased towards the membrane 25 by a spring 26. At the outlet of the measuring unit a shut-off valve 9 is provided which in dosing conditions acts as explained above with respect to FIG. 4. In non-dosing conditions (when piston 24 is moved backwards and liquid is streaming into the measuring unit) the shut-off valve 9 must be closed. The valves 9 and 23 are both magnetic valves. Once the shut-off valve 9 is closed and the valve 23 is opened and the force from the fluid flowing through valve 23 and acting on the membrane is larger than the force on the piston 24 coming from the spring 26, the spring 26 will be compressed and the piston 24 will be displaced until stopped by the facing of the house. This end position is detected of the sensor 27 which through the connection 21 will signal to the control unit which in turn closes the valve 23 and start operating shut-off valve 9. During this operation the biasing force from the spring 26 will displace the piston 24 in opposite direction thereby pressing fluid being accumulated in the measuring unit towards the shut-off valve 9.

The fluid transfer system of FIG. 6 is used in the following manner. Initially, the shut-off valve 9 is closed and the valve 23 is opened. Once the valve 23 is opened the membrane 25 and the piston 24 moves against the biasing force from the spring 26. The valve 23 stays open until the displacement sensor 27 detects that the piston 24 has reached its bottom position where no further compression of the spring 26 occurs. The sensor sends a signal to the control unit 20 once the piston has reached its bottom position. Thereafter the valve 23 is closed and the shut-off valve 9 is opened and operated in PWM mode until the piston has reached its top position. The sensor 27 signals this to the control unit 20. As the displacement of the piston 24 corresponds to a delivered amount of urea the delivered amount can be monitored by logging the signal representing the upper or lower most position of the piston 24. Once the piston 24 reaches its upper most position, the shut-off valve 9 is closed, the valve 23 is opened and the cycle is repeated.

Also this embodiment may be assembled into a unit as disclosed in connection with the above embodiment.

Figure 7:
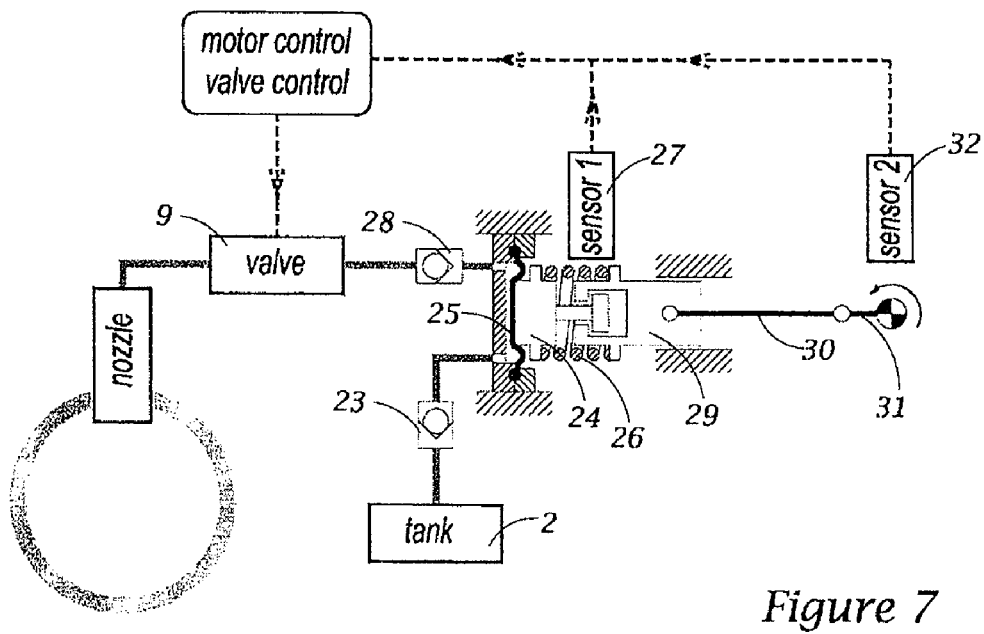
FIG. 7 shows schematically an embodiment of a fluid transfer system according to the present invention corresponding to FIG. 5.

FIG. 7 shows an embodiment of the system corresponding to FIG. 5. In this embodiment a combined pump/measuring unit performs the pressurisation of the fluid and gives information to the control unit 20 about the amount delivered. Again, the transfer system comprising a tank 2 connected to the pumping/measuring unit 22 via a valve 23. However, in this embodiment, the valve 23 is a one-way valve and a further one-way valve 28 is arranged in the outlet of the pump/measuring unit. The pumping in this embodiment also comprises a piston 24, a membrane 25 and a spring 26. The assembly of the piston 24, the membrane 25 and the spring 26 is slidable attached to a sub-piston 29. The sub-piston 29 is connected via a connecting rod 30 to a crank 31 so that the rotation of the crank 31 results in a reciprocating displacement of the sub-piston 29. The piston 24 will tend to follow this reciprocating displacement of the sub-piston 29. However, as the piston 24 is slidable arranged in the sub-piston 29 and biased by the spring 26 the displacement of the piston 24 will differ from the displacement of the sub-piston 29.

Also in this embodiment, the transfer system is equipped with a sensor 27 sensing the end positions in the relative movement between piston 24 and sub-piston 29. A further sensor 32 is arranged for sensing the upper dead position of the crank 31.

When the sub-piston 29 is moved towards it lower position, the piston 24 will once the spring 26 is fully expanded follow this displacement. This will result in that the pressure above the membrane 25 is decreased causing the valve 23 to open and the valve 28 to close, thereby fluid will be drawn from the tank and into the pump/measuring unit. When the sub-piston 29 thereafter moves towards it upper position the valve 23 closes. During this displacement of the sub-piston 29, the spring will be compressed as the shut-off valve 9 is closed during this movement and the force from the pressure on the membrane 25 is larger than the force applied by the spring 26 on the piston 24. When the spring 26 has been maximally compressed and the crank 31 is stopped in upper dead position (signalled by the sensor 32 to the control unit 20) the nozzle can atomize urea in PWM mode as previously described and the spring 26 will start to expand. Such expansion of the spring 26 will result in that fluid may still be pressurised and delivered even though the crank 31 is not rotating. In fact it may be essential for the function of the system that the shut-off valve 9 only is operated when the crank 31 and thus the sub-piston is not moving.

Figure 8:
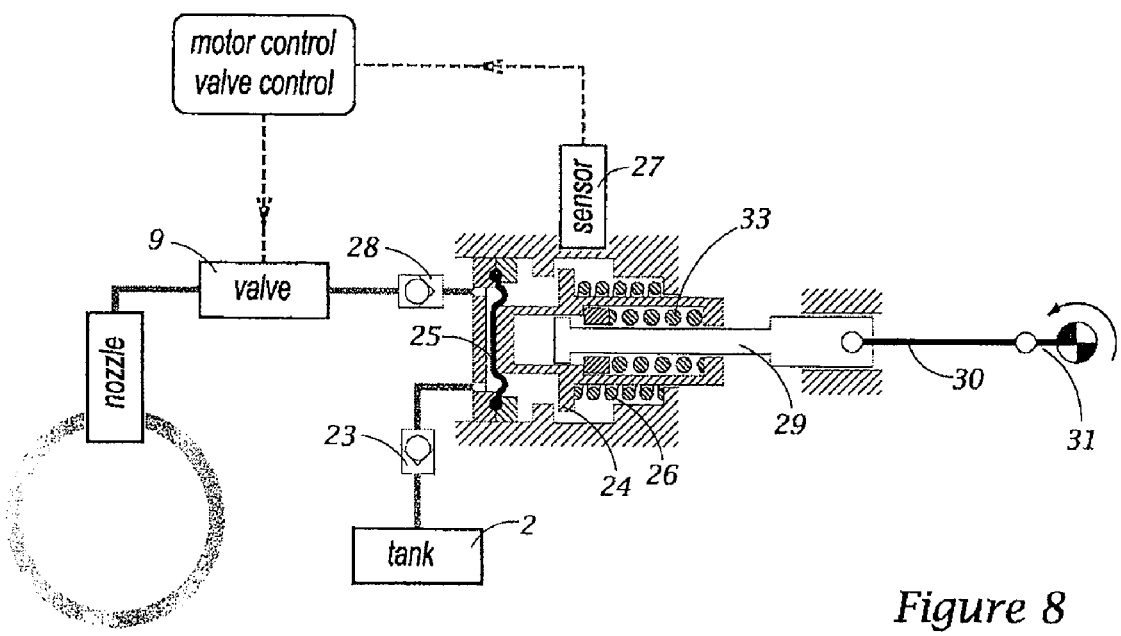
FIG. 8 shows schematically another embodiment of a fluid transfer system according to the present invention corresponding to FIG. 5.

FIG. 8 shows another embodiment of the system corresponding to FIG. 5. This embodiment has many similarities with the embodiment shown in FIG. 7 and same numerals are used for similar elements. As in FIG. 6 the movement of the piston 24 and thus the membrane 25 is limited relatively to the housing and not relatively to the sub-piston 29 whereby the precision can be improved and the detection of end positions can be simplified. As shown in FIG. 8 the sub-piston 29 engages with the piston 24 via a preloaded spring 33. In the top dead position there is a clearance between spring 33 and sub-piston 29 and in the lower dead position the spring 33 can be slightly further compressed. This means that the movement of the crank mechanism is uncritical concerning precision. Apart from this the function is as described in connection to FIG. 7.

Figure 9:
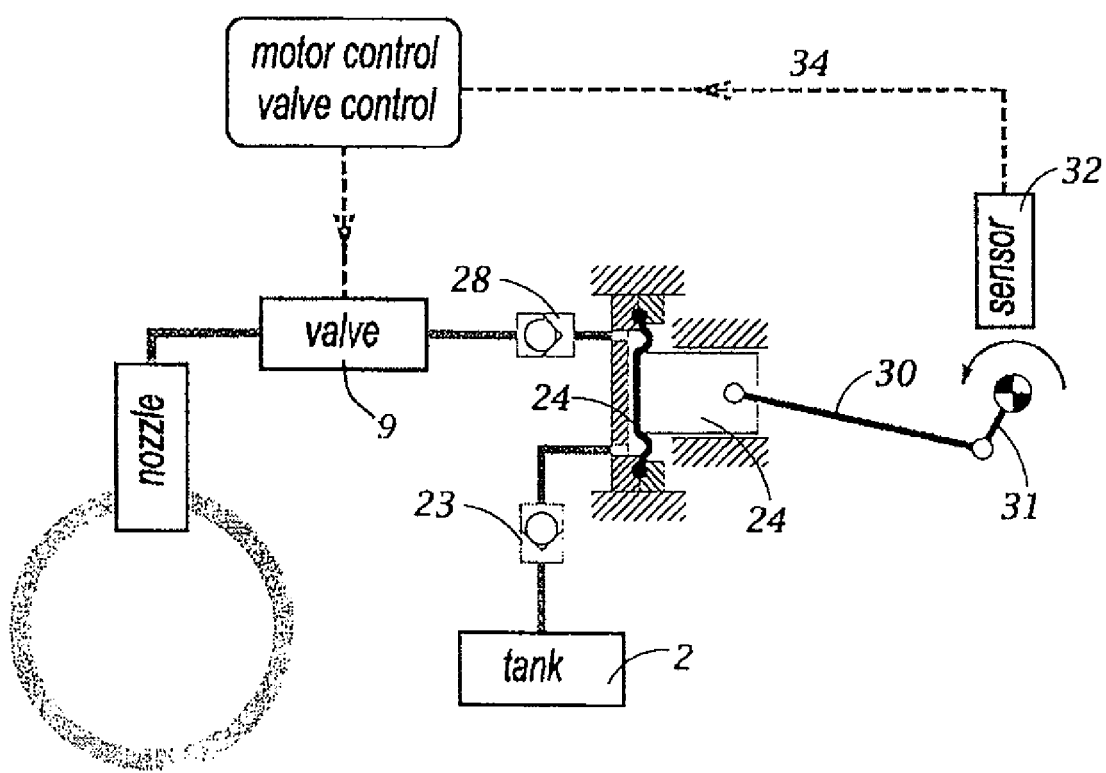
FIG. 9 shows schematically a third embodiment of a fluid transfer system according to the present invention corresponding to FIG. 5.

FIG. 9 shows another embodiment of the system corresponding to FIG. 5. This embodiment comprises a pump/measuring unit connected at the inlet to a tank via a one-way valve 23 and at the outlet of the pumping/measuring unit a one-way valve 28 is arranged. The two one-way valves 23 and 28 play the same role as the two one-way valves in a normal pump. The pump/measuring unit comprises a piston 24 and a membrane 25 similar to the piston and membrane of the above discussed embodiments. The piston 24 in this embodiment is directly connected to a crank 31 via a connecting rod 30.

The pump is typically controlled to maintain a substantially constant pressure at the shut-off valve 9. The shut-off valve 9 is typically opened and closed in a pulsating (PWM) manner based on the actual need for urea. Due to the highly defined geometry each revolution of the crank represents a well defined and known volume delivered, and a sensor 32 may detect the amount pumped by picking up a signal for each revolution or a known fraction of a revolution. This detection is uncritical as an error is not accumulating. The signals will via the connection 34 provide information for changing the PWM of shut-off valve 9 in order to minimize the accumulative error.

The shut-off valve 9 can be operated without interruption in the earlier described manner (PWM).

It should be noted the pump may have two membranes operating in opposite phases, one membrane having a suction stroke, while the other is pumping.

In the above a number of different embodiments are disclosed which each deals with delivery of liquefied Urea into an exhaust system. A common characteristic of the different embodiments is the presence of a shut-off valve 9 arranged before the nozzle. Although the shut-off valve may be dispensed with it is preferably applied in order to control the flow of urea to the nozzle; in some embodiments the shut-off valve is in combination with a buffer used to secure sufficient pressure of the fluid and in other embodiments used to control the amount of fluid delivered to the nozzle. A combination thereof is, of course, also possible.

As indicated, delivery of urea according to the present invention may mainly be performed in four different manners:

I. Open loop operation: From the knowledge of system parameters (such as nozzle constant, pressure of the fluid before the nozzle, temperature and viscosity of the fluid, characteristics of the shut-off valve etc.) the delivery of urea to the nozzle according to the need demanded (demand) from the motor control unit is controlled according to an administering algorithm determining opening and closing periods for the valve. The valve is operated solely on basis of system parameters (e.g. on basis of temperature and pressure measurements) without any feedback from actually delivered volume. Typically, such an operation results in a high cost system.

II. Use of a dosing pump as shown FIGS. 2 and 3. The dosing pump provides a highly accurate flow rate and pressurisation is provided by a combination of a buffer and an administering valve; in FIG. 2 the administering valve is termed shut-off valve.

III. Use of a measuring pump maintaining an approximately constant pressure being high enough to ensure atomization. The measuring pump pressurises the fluid and signals to a motor control unit that a well defined amount of urea has been delivered. This is indicated in FIG. 5 in which the measuring pump is referenced with numeral 22.

Figure 12:
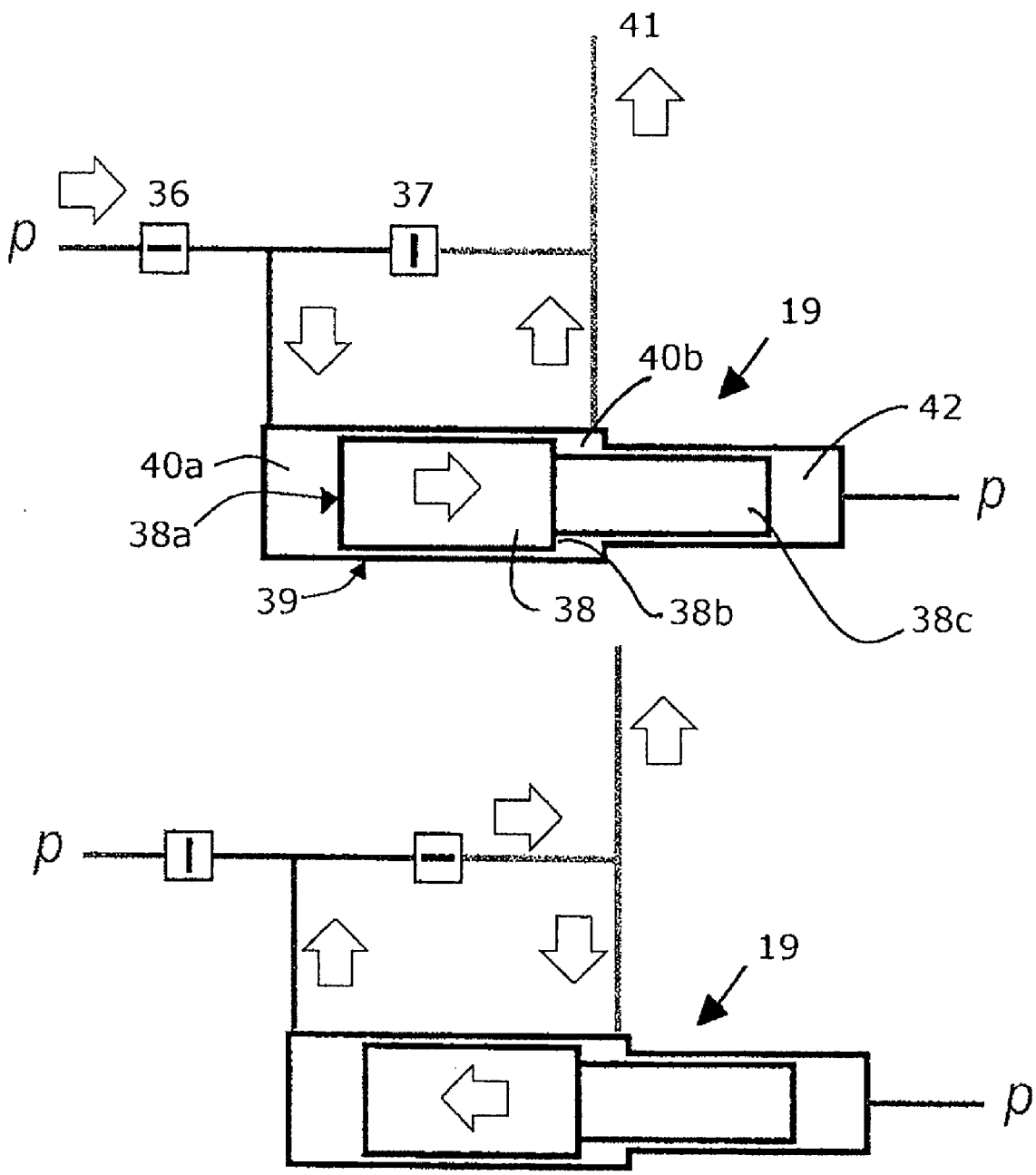
Figure 13:
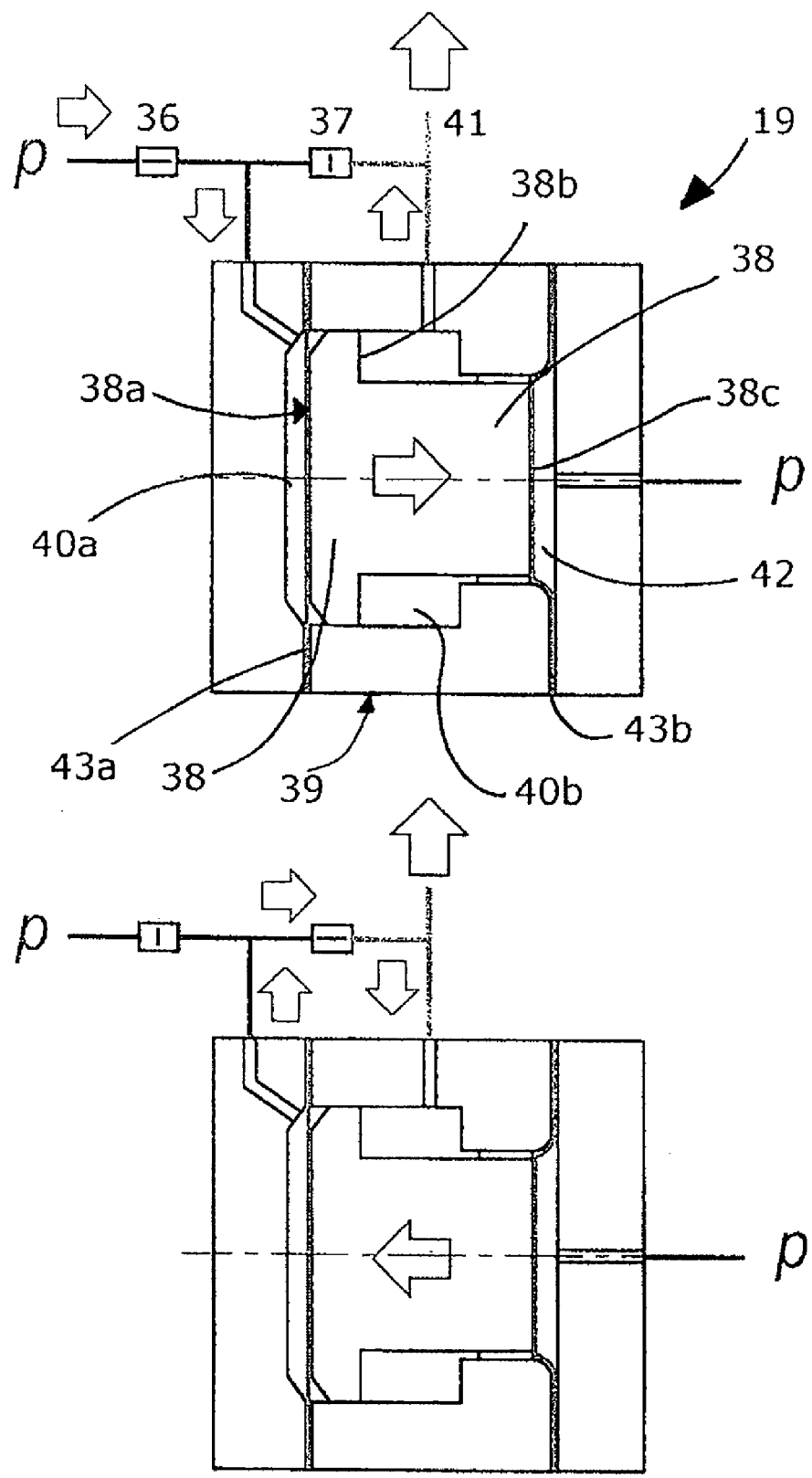

IV. Use of a measuring unit as shown in FIG. 4. Use of a measuring unit is especially advantageous in situations where urea is to be added at several locations and/or where easy access to pressurisation (e.g. pressurised air) is present. Various embodiments of measuring units are depicted in FIGS. 12 and 13. Operation of the administering valve may be done in a similar manner as when a measuring pump is used (FIG. 10).

Figure 10:
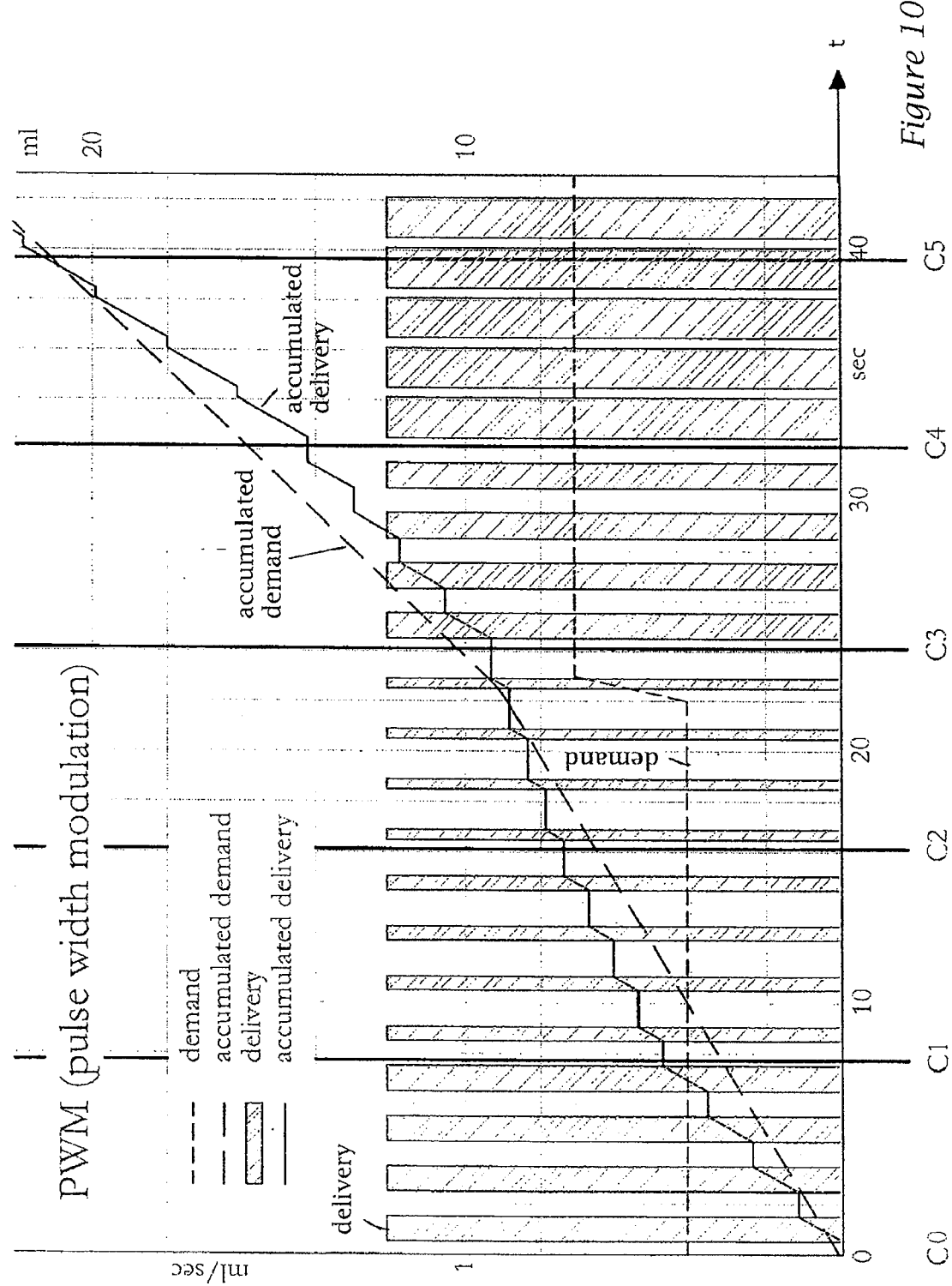
FIG. 10 shows graphically an example on a strategy for delivery of urea according to preferred embodiments of the present invention.

FIG. 10 shows graphically an example of a strategy for delivery of urea according to preferred embodiments of the present invention. The strategy is based on PWM (pulse width modulation). Although PWM and PIM (pulse interval modulation) may both be applied in connection with the present invention, it has been found that due to the large dynamic span of delivery (more than a factor 100 between the largest and smallest delivery amount per time unit) PIM seems to be less useable due to a fixed pulse width, as the width of the pulses must be small in order to deliver small amounts without very large pulse intervals resulting in that the shut-off valve at larger delivery has to be activates many times which in turn results in lower lifetime for the valve.

PWM provides the possibility to choose a suitable pulse interval while taking into account the dynamics (typically the buffer effect) of the catalytic system.

The strategy shown in FIG. 10 is based on comparing accumulated delivery with accumulated demand at certain points in time (when the measuring pump or the measuring unit send information about delivered amounts to the motor/valve control unit). Based on this information the algorithm for controlling the width of the pulses is changed in order to maintain a good accuracy.

In FIG. 10 C0, C1, C2, C3, C4 and C5 represent points in time where accumulated delivery is compared with accumulated demand. The immediate demand (ml/s, labelled demand in FIG. 10) is prescribed by a controlling unit, typically a motor controlling unit. The accumulated demand (ml), delivered amount (ml/s, labelled delivery (pulses)) and accumulated delivery (ml) are indicated in FIG. 10. Accumulated values may preferably be determined by integration. For illustration the accumulated curves are showed as continuous curves but in praxis the control unit will compare values at interval (C1, C2, ... etc.) and calculate a single deviation value for use in the next interval (as will be seen in FIG. 11).

The administrating algorithm determining activation of the shut-off valve (pulse width) may comprise a number of elements, such as deviations in the accumulated delivery from accumulated demand, error in accumulated delivered amount between two feed back times, the rate of change at which such error changes etc.

With reference to FIG. 10 delivery is made with a constant pulse within each interval if the demand is constant. At C1, the accumulated delivery is compared to the accumulated demand and it is found that the delivery has been too high. Consequently, the pulse width is decreased at C1 and kept constant from C1 to C2. At C2 the accumulated demand is again compared to the accumulated delivery and it is found that the accumulated delivery still is higher than the accumulated demand although the accumulated delivery is approaching the accumulated demand. Consequently, the pulse width is decreased further.

Between C2 and C3 the demand for delivery is increased and as the accumulated demand is higher than the accumulated delivery at C3, the pulse width is consequently increased in order to increase the delivery. At C4 it is found that the increase is not sufficient to meet the demand and at C4 the pulse width is again increased.

Figure 11:
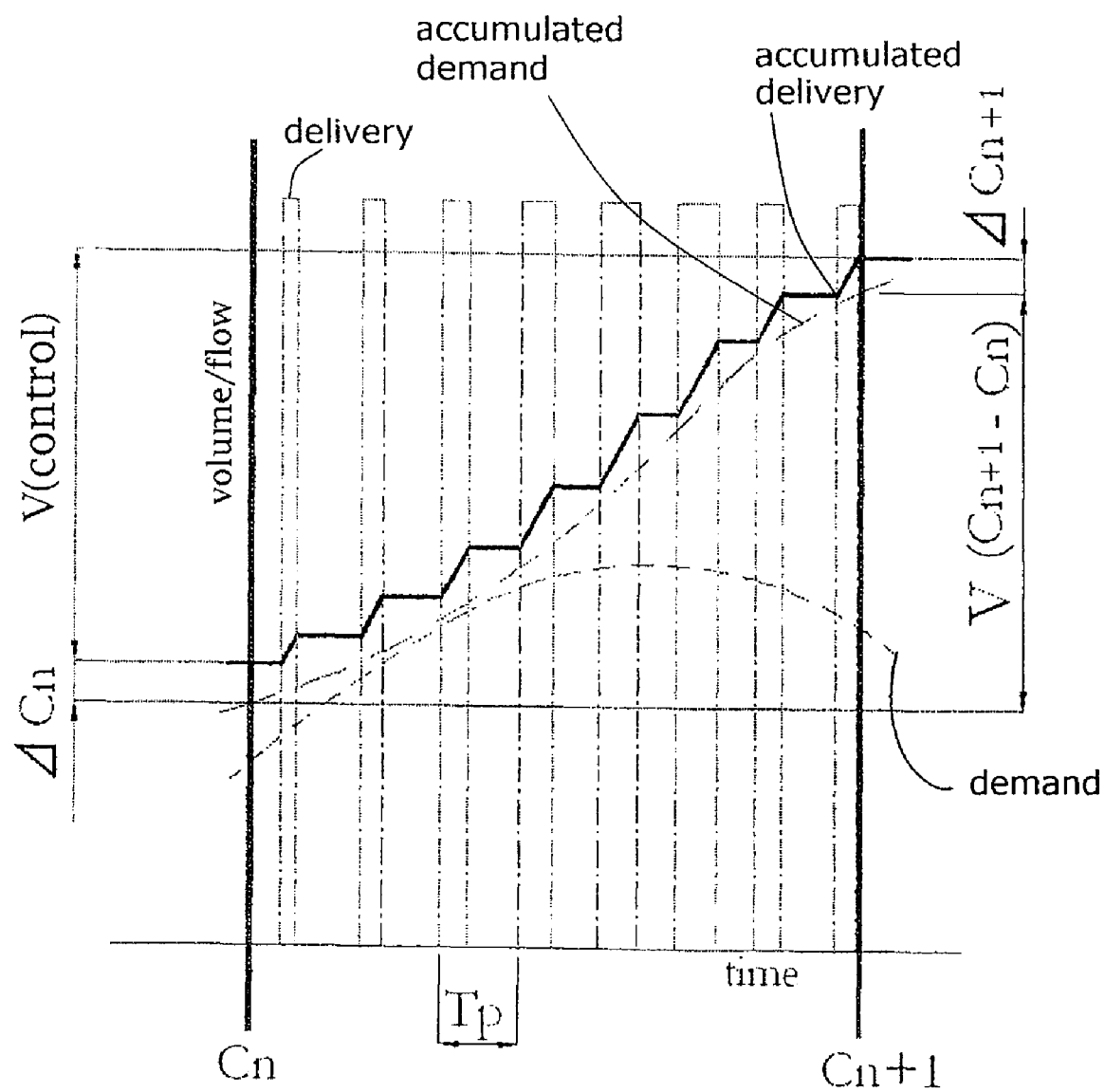
FIG. 11 shows graphically details on a strategy for delivery of urea according to preferred embodiments of the present invention, and FIGS. 12 and 13 each show schematically preferred embodiments of measuring units according to the present invention.

A more realistic situation with varying demand and thus varying pulse width within an interval is shown in FIG. 11. Here is shown a single interval Cn–Cn+1 with the same line labelling as in FIG. 10. Pulse width is determined of the motor/valve control unit as a function of system parameters (nozzle constant, pressure of the fluid at the shut-up valve, viscosity of the fluid, valve characteristic etc.) the need of delivery flow at the start of a pulse and the time distance between pulses. The value will be approximately Fdemand/Fmax*Tp, where Fdemand denotes the need of delivery flow at the start of a pulse, Fmax stands for the flow with an open shut-up valve and Tp is the time between two subsequent pulses. When the volume V(control) has been delivered from the measuring pump (at time Cn+1) the correcting signal is sent to the motor/valve control unit and the accumulated demand is compared to V(control). The surplus (V(control)−V(Cn−1−Cn)) and the known accumulated error at Cn ($\Delta$Cn) determines the accumulated error at time Cn+1.

Obviously there exist a number of strategies to modify the algorithm for pulse width in the following interval. A simple one is aiming to deliver the accumulated demand volume for the next interval (that means $\Delta$Cn+1=$\Delta$Cn+2) by multiplying the pulse width function by a factor ($\Delta$Cn−$\Delta$Cn+1)/V(control). Of course it will never be absolutely correct as the demand is varying but as this variation is continuous and intervals are rather short it will give a serviceable approximation. Another strategy will be to aim to have zero accumulative error ($\Delta$Cn+2=0).

Embodiments which advantageously can be used in connection with the above strategy are shown in FIGS. 12 and 13. FIG. 12 shows a measuring unit 19 shaped as a corbie-stepped piston device. However, the embodiments of FIGS. 12 and 13 are applicable in connection with other strategies.

The measuring unit 19 comprising a cylinder 39 in which a corbie-stepped piston 38 is slideable arranged. The corbie-stepped shape of the piston 38 is provided by the piston part 38c whereby the area 38a is larger than the area 38b as shown in the figure. The measuring device 19 receives fluid through valve 36. The fluid is pressurised to a pressure P and is received from pressurised reservoir or a pump. The outlet of valve 36 connected to the larger displacement volume 40a of cylinder 39, and connected to the smaller displacement volume 40b of the cylinder 39 via a valve 37. The connection between the valve 37 and the smaller displacement volume 40b also comprises a discharge 41 in the configuration shown in FIG. 12.

Above the end of the piston part 38c opposite the end connected to the piston 38 a displacement volume 42 is provided. This displacement volume 42 receives fluid at the same or substantial same pressure P as fed to the valve 36. In a preferred embodiment, the fluid supplied to valve 36 and displacement volume 42 comes from the same source.

FIG. 12 shows two modes of the measuring device. In the upper part of FIG. 12, valve 36 is open and valve 37 is closed whereby fluid at pressure P streams towards the larger displacement volume 40a. As the area of the top of the piston part 38c is smaller than the area 38a and the pressure in displacement volumes 40a and 42 are equal, the piston 38 will be displaced to the right with reference to FIG. 12. The right-going movement results in that fluid present in displacement volume 40b is pressed out through the discharge 41. This action continues until the piston 38 reaches its right-most position at which position valve 36 is closed and 37 is opened; this situation is disclosed in lower part of FIG. 12.

When valve 36 is closed and valve 37 is open, the pressure in displacement volume 42 will push the piston 38 to the left with reference to FIG. 12. Fluid present in displacement volume 40a will flow out, through the valve 37 and into the displacement volume 40b as well as out through the discharge 41. This left-going action continues until the piston 38 reaches its left-most position, when the states of the valves 36 and 37 are both changed and the cycle repeats.

The embodiment of FIG. 12 has among other advantages that the delivery is present except at the left-most and right-most positions of the piston and that the pressure of the fluid delivered to the discharge 41 is well defined. Furthermore, a strong geometrical relationship is present between the amount of fluid delivered through discharge 41 and the movement of the piston part 38c.

The size of the areas 38a and 38b may be selected so that the same amount delivered to the discharge irrespective of the way the piston 38 moves. This may be achieved when the size of area 38a is twice the size of area 38b. Furthermore, the sizes of the displacement volumes have the following ratio 2:1:1 (40a:40b:42). Embodiments like the one shown in FIG. 12 has the further advantages that the direction change of the piston 38 can be performed very quickly and thereby only little interruption in fluid delivery is present (the directional change is typically governed by the speed at which the state of the valves can be changed). In other embodiments where a suction stroke is present the interruption is comparable larger.

By arranging the valves 36 and 37 as indicated on FIG. 12 redirection valves are not needed and the relatively simpler shut-off valves may be applied.

FIG. 13 shows an embodiment similar to the embodiment of FIG. 12. Features of the embodiment shown in FIG. 13 which are similar to features shown in FIG. 12 have been labelled with the same numerals. Similarly, the upper part of FIG. 12 shows a situation where the piston 38 moves to the right, and the lower part shows a situation where the piston moves to the left.

In the embodiment of FIG. 13, sealing membranes 43a and 43b are provided between the piston 38 and the displacement volume 40a and between the piston part 38c and the displacement volume 42. The presence of the sealing membranes 43a and 43b provides a seal hindering fluid from flowing between the volumes 40a and 40b pass the edge of the piston 38.

Even though, the present description has focused on different embodiments each having distinct features it should be emphasised that features disclosed in connection with one embodiment is applicable in connection with another embodiment.

The invention claimed is:

1. A fluid transfer system for transferring fluid from a reservoir (2) to a receiving device, the fluid transfer system comprising:
   a through flow device (6) adapted to receive fluid from the reservoir (2) and transfer fluid through the system and comprising a measuring unit adapted to measure the amount of fluid being transferred from the reservoir to the receiving device,
   a controllable shut-off valve (9) arranged upstream of the receiving device and downstream of the through flow device (6),
   a controlling unit controlling at least the state of the shut-off valve (9)
   wherein the controlling unit is adapted to control the state of the shut-off valve so that the delivered amount corresponds to a demand in such a way that the controlling comprises operating the shut-off valve in PWM-mode (pulse width modulation-mode), and
   wherein the controlling unit is adapted to determine the accumulated demand for a given interval, accumulate the delivery during at least part time of the interval by the measuring unit and adapt the width(s) of one or more pulses in said interval so that the accumulated delivery in said intervals equals the accumulated demand.

2. A fluid transfer system according to claim 1, wherein the through flow device further comprises a pump.

3. A system according to claim 1, wherein the shut-off valve (9) is an electromagnetic valve.

4. A system according to claim 1, further comprising a pressure sensor (13) arranged to measure the pressure of the fluid at a location upstream of the shut-off valve (9).

5. A system according to claim 1, further comprising a valve (23) arranged upstream of the through flow device.

6. A system according to claim 5, wherein the through flow device comprises a piston (24) and a membrane (25), the piston is abutting, such as engaging, the membrane (25).

7. A system according to claim 6, further comprising a displacement sensor (27, 32) sensing the displacement of the piston (24).

8. A system according to claim 6, further comprising a spring (26) being arranged so that the spring (26) is biasing the piston (24) towards the membrane (25).

9. A system according to claim 6, wherein the piston (24) is in slideable engagement with a sub-piston (29), and the sub-piston (29) is connected to a crank (31) by a connecting rod (30).

10. A system according to claim 9, further comprising a one-way valve (28) arranged upstream of the shut-off valve (9) so as to allow fluid to flow towards the shut-off valve (9) only, and wherein the valve (23) arranged upstream of the through flow device is a one-way valve allowing fluid to flow towards the through flow device only.

11. A system according to claim 6, wherein the piston (24) is connected to a crank (31) by a connecting rod (30).

12. A system according to claim 11, further comprising a one-way valve (28) arranged between the through flow device and the shut-off valve (9), the one-way valve (28) is arranged to allow fluid to flow towards the shut-off valve (9) only.

13. A system according to claim 5, wherein the through flow device comprises:
   a measuring unit (19), the system comprising:
   a cylinder (39) in which a corbie-stepped piston (38) is slideable arranged, so as to provide two displacement volumes (40a, 40b) of different sizes and a second valve (37), wherein the inlet of the valve (36) arranged upstream of the through flow device is connected to or connectable to a fluid source, and the outlet of said valve (36) is connected to the larger of the displacement volumes and to the inlet of the second valve (37), the outlet of the second valve (37) being connected to the smaller of the displacement volumes and to a discharge.

14. A system according to claim 13, wherein the cylinder (39) further comprises a further displacement volume (42) provided above a piston part (38c) forming part of the piston (38), the displacement volume (42) being connected to or connectable to a fluid source, preferably being the same fluid source to which the inlet of valve (36) is connected to or connectable to.

15. A system according to claim 14, wherein the two displacement volumes (40a, 40b) are sealed from each other by a membrane (43a) wherein the smaller displacement volume (40b) is sealed from the further displacement volume (42) by a membrane (43b).

16. A system according to claim 1, further comprising a fluid connection (15) extending from the shut-off valve (9) to the receiving device, the connection is stiff so as to avoid expansion of the connection (15) which would cause uncontrollable flow through the connection due to contraction of the connection (15) when the shut-off valve (9) is closed.

17. A system according to claim 1, further comprising the reservoir (2).

18. A system according to claim 1, wherein the receiving device is a nozzle (5).

19. A system according to claim 18, wherein the nozzle (5) is arranged in an exhaust system so that it sprays fluid into the exhaust system.

20. An exhaust system comprising a fluid transfer system according to claim 1.

21. A method of transferring fluid from a reservoir (2) to a receiving device, the fluid transfer system comprising:
   a through flow device (6) adapted to receive fluid from the reservoir (2) and transfer the fluid through the system and comprising a measuring unit adapted to measure the amount of fluid being transferred from the reservoir to the receiving device,
   a controllable shut-off valve (9) arranged upstream of the receiving device and downstream of the through flow device (6), a controlling unit controlling at least the state of the shut-off valve (9)

the method comprising controlling the state of the state of the shut-off valve so that the delivered amount corresponds to a demand, wherein the controlling comprises operating the shut-off valve in PWM-mode (pulse width modulation-mode), and wherein the controlling unit is adapted to determine the accumulated demand for a given interval, accumulate the delivery during at least part time of the interval by the measuring unit and adapt the width(s) of one or more pulses in said interval so that the accumulated delivery in said intervals equals the accumulated demand.

22. A method according to claim 21, wherein the through flow device further comprises a pump.

23. A method according to claim 21, further comprising measuring the pressure of the fluid at a location upstream of the shut-off valve (9) and downstream of the pump (7).

24. A method according to claim 21, wherein the controlling of the shut-off valve comprises closing the shut-off valve once the accumulated delivery has reached the accumulated demand in said interval.

25. A method according to claim 21, the method comprising:
A) operating the shut-off valve in PWM-mode with one or more pulse widths in a time interval,
B) at the end of said time interval comparing the accumulated delivery with the accumulated demand,
C) at the end of said time interval setting the pulse width(s) of the PWM-mode for a succeeding time interval in response to the comparison and operating the shut-off valve with the so changed pulse width(s) in an succeeding interval,
D) repeating steps B) and C).

26. A method according to claim 25, further comprising setting the pulse width(s) while delivering during said interval.

27. A method according to claim 21, wherein setting of the pulse width(s) comprises adjusting an administering algorithm.

28. A method according to claim 25, wherein the pulse width(s) are varying during a time interval.

29. A method according to claim 25, wherein the pulse width(s) are equal during a time interval.

30. A method according to claim 25, wherein the accumulated delivery is the amount delivered since a selected point in time, and the accumulated demand is the amount demanded since the selected point in time.

31. A method according to claim 30, wherein the selected point in time is an instant where the accumulated demand and accumulated delivery is reset, such as when the delivery is initiated.

32. A method according to claim 30, wherein a selected point in time is at the end of a last selected time period so that method is performed in a cyclic manner.

33. A method according to claim 21, wherein the fluid is urea or urea derivatives.

34. A method according to claim 21, wherein the reservoir (2) stores pressurised fluid at a pre-selected level or comprises, such as is, a pump pressurising fluid to a pre-selected level.

35. A method according to claim 21, wherein the method is embedded in a system according to claim 1.

* * * * *